(12) United States Patent
Bashir et al.

(10) Patent No.: US 10,567,460 B2
(45) Date of Patent: Feb. 18, 2020

(54) MANAGING DATA USING A TIME-BASED DIRECTORY STRUCTURE

(71) Applicant: APPLE INC., Cupertino, CA (US)

(72) Inventors: Ahmed M. Bashir, Saratoga, CA (US); Vasilii Vlasov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 15/177,852

(22) Filed: Jun. 9, 2016

(65) Prior Publication Data
US 2017/0357449 A1     Dec. 14, 2017

(51) Int. Cl.
*H04L 29/06* (2006.01)
*H04L 29/08* (2006.01)
*G06F 16/10* (2019.01)

(52) U.S. Cl.
CPC ............ *H04L 65/605* (2013.01); *G06F 16/10* (2019.01); *H04L 67/2852* (2013.01)

(58) Field of Classification Search
None
See application file for complete search history.

(56) References Cited

U.S. PATENT DOCUMENTS

| | | | | |
|---|---|---|---|---|
| 5,403,639 A * | 4/1995 | Belsan | ................. | G06F 16/10 |
| 5,590,320 A * | 12/1996 | Maxey | ................. | G06F 3/0601 |
| 5,727,201 A * | 3/1998 | Burke | ............... | G06F 16/90348 |
| 5,819,261 A * | 10/1998 | Takahashi | ............... | G06F 16/40 |
| 5,832,496 A * | 11/1998 | Anand | ................. | G06F 16/248 |
| 5,881,238 A * | 3/1999 | Aman | ..................... | G06F 9/505 709/226 |
| 5,925,102 A * | 7/1999 | Eilert | ................... | G06F 9/4887 709/226 |
| 6,069,827 A * | 5/2000 | Sinclair | ................ | G06F 3/0601 365/185.29 |
| 6,073,137 A * | 6/2000 | Brown | .................... | G06F 9/451 |
| 6,199,072 B1 * | 3/2001 | Jian | ......................... | G06F 16/10 |
| 6,651,061 B2 * | 11/2003 | Unchida | ............... | H04L 63/02 |
| 7,142,512 B1 * | 11/2006 | Kobayashi | ......... | H04L 41/5019 370/232 |
| 7,457,910 B2 * | 11/2008 | Chang | ................. | G06F 3/0608 711/103 |
| 7,493,525 B2 * | 2/2009 | Wigley | .............. | G06F 11/0748 714/37 |
| 7,539,706 B1 * | 5/2009 | Campbell | ........... | G06F 16/1827 |
| 7,676,510 B1 * | 3/2010 | Karinta | .............. | G06F 11/1448 707/654 |
| 7,683,940 B2 * | 3/2010 | Fleming | ............... | G11B 27/034 348/207.1 |
| 7,743,203 B2 * | 6/2010 | France | ................ | G06F 12/0246 711/103 |
| 8,149,706 B2 * | 4/2012 | Turlington | .......... | H04L 12/4633 370/233 |
| 8,370,835 B2 * | 2/2013 | Dittmer | .............. | G06F 9/45558 711/115 |

(Continued)

*Primary Examiner* — Backhean Tiv
(74) *Attorney, Agent, or Firm* — Fletcher Yoder PC (57) ABSTRACT

A server (or server instance) may receive data during a plurality of sequential blocks of time. The server may store the data received in each block of time in a corresponding separate directory within a data store. The server may determine that a threshold storage capacity of the data store has been reached and, in response to the determining, may clear a directory in which oldest data received in an earliest block of time has been stored.

34 Claims, 6 Drawing Sheets

(56) References Cited

U.S. PATENT DOCUMENTS

| | | | | |
|---|---|---|---|---|
| 8,392,448 B2* | 3/2013 | Ge | H04L 12/4633 | 707/769 |
| 8,423,657 B2* | 4/2013 | Jun | H04L 12/12 | 709/227 |
| 8,489,817 B2* | 7/2013 | Flynn | G06F 1/183 | 711/103 |
| 8,503,991 B2* | 8/2013 | Swift | H04L 43/00 | 455/115.1 |
| 8,599,277 B2* | 12/2013 | Fleming | G11B 27/034 | 348/207.1 |
| 8,650,228 B2* | 2/2014 | Wideman | G06F 16/1748 | 707/813 |
| 8,732,429 B2* | 5/2014 | Coronado | G06F 11/1456 | 707/663 |
| 8,868,602 B2* | 10/2014 | Lesser | G06F 16/21 | 707/770 |
| 8,886,882 B2* | 11/2014 | Nakajima | G06F 12/0862 | 711/117 |
| 9,009,265 B2* | 4/2015 | Zapata | H04L 43/0811 | 709/219 |
| 9,043,637 B2* | 5/2015 | Saika | G06F 11/1417 | 714/6.1 |
| 9,408,251 B2* | 8/2016 | Grady | H04W 84/18 | |
| 9,489,387 B2* | 11/2016 | Marlatt | G06F 16/71 | |
| 9,875,031 B2* | 1/2018 | Horn | G06F 3/0608 | |
| 2002/0172502 A1* | 11/2002 | Okamoto | G11B 27/105 | 386/229 |
| 2002/0176005 A1* | 11/2002 | Okamoto | H04N 1/2112 | 348/207.99 |
| 2003/0079038 A1* | 4/2003 | Robbin | G06F 1/1613 | 709/232 |
| 2003/0191752 A1* | 10/2003 | Fairweather | G06F 8/427 | |
| 2004/0059706 A1* | 3/2004 | Abelite | G06F 16/10 | |
| 2004/0143626 A1* | 7/2004 | Kemp | H04L 29/06 | 709/203 |
| 2004/0204949 A1* | 10/2004 | Shaji | G06F 11/1415 | 717/174 |
| 2004/0215534 A1* | 10/2004 | Gautier | G06Q 20/04 | 705/30 |
| 2004/0252207 A1* | 12/2004 | Yamamoto | G08B 13/19667 | 348/239 |
| 2005/0193030 A1* | 9/2005 | Abe | G06F 16/10 | |
| 2005/0273476 A1* | 12/2005 | Wertheimer | G06F 11/1458 | |
| 2006/0020627 A1* | 1/2006 | Poslinski | H04N 5/781 | |
| 2006/0163358 A1* | 7/2006 | Biderman | H04L 67/1095 | 235/472.01 |
| 2006/0279628 A1* | 12/2006 | Fleming | G11B 27/034 | 348/143 |
| 2007/0030524 A1* | 2/2007 | Murakoshi | G06F 16/168 | 358/403 |
| 2007/0033354 A1* | 2/2007 | Burrows | G06F 16/184 | 711/156 |
| 2007/0255770 A1* | 11/2007 | Murase | G06F 3/0605 | |
| 2008/0065705 A1* | 3/2008 | Miller | G05B 21/02 | |
| 2008/0133830 A1* | 6/2008 | Nitta | G06F 3/061 | 711/113 |
| 2008/0134028 A1* | 6/2008 | Whitmyer | G06F 3/0482 | 715/700 |
| 2008/0177775 A1* | 7/2008 | Kawate | G11B 20/10 | |
| 2008/0208927 A1* | 8/2008 | Chikusa | G06F 3/0605 | |
| 2008/0243879 A1* | 10/2008 | Gokhale | G06F 11/1453 | |
| 2009/0119469 A1* | 5/2009 | Dellantoni | G06F 21/10 | 711/166 |
| 2009/0125565 A1* | 5/2009 | Brons | G06F 16/113 | |
| 2009/0305680 A1* | 12/2009 | Swift | H04L 43/00 | 455/414.1 |
| 2010/0115130 A1* | 5/2010 | Jun | H04L 12/12 | 709/242 |
| 2010/0245072 A1* | 9/2010 | Harel | G08B 13/19656 | 340/463 |
| 2010/0332401 A1* | 12/2010 | Prahlad | G06F 3/0649 | 705/80 |
| 2011/0167221 A1* | 7/2011 | Pangal | G06F 11/1453 | 711/117 |
| 2012/0110108 A1* | 5/2012 | Li | H04L 67/2852 | 709/213 |
| 2012/0136960 A1* | 5/2012 | Liu | G06F 16/1752 | 709/217 |
| 2013/0054536 A1* | 2/2013 | Sengupta | G06F 16/21 | 707/654 |
| 2013/0262865 A1* | 10/2013 | Irvine | G06F 21/6218 | 713/165 |
| 2014/0012867 A1* | 1/2014 | Moss | G06N 3/02 | 707/756 |
| 2014/0101178 A1* | 4/2014 | Ginter | G06F 16/334 | 707/755 |
| 2014/0115164 A1* | 4/2014 | Kalyanaraman | H04L 29/08954 | 709/226 |
| 2015/0134723 A1* | 5/2015 | Kansal | H04L 67/1031 | 709/203 |
| 2015/0358394 A1* | 12/2015 | Pall | G06F 16/957 | 709/217 |
| 2016/0036623 A1* | 2/2016 | Clarkson | H04L 41/0668 | 714/4.11 |
| 2016/0188689 A1* | 6/2016 | Singh | G06F 16/27 | 707/610 |
| 2017/0083541 A1* | 3/2017 | Mann | G06F 16/119 | |
| 2017/0206022 A1* | 7/2017 | Theinert | G06F 3/0608 | |
| 2017/0357449 A1* | 12/2017 | Bashir | H04L 65/605 | |

\* cited by examiner

MANAGING DATA USING A TIME-BASED DIRECTORY STRUCTURE

TECHNICAL FIELD

The disclosure generally relates to data management.

BACKGROUND

Computing devices such as servers may handle a high volume of data requests from network devices. In some cases, many devices may request the same data. For example, a media server may receive a high volume of requests for popular streaming video and/or audio content (e.g., a popular song or viral video). The server may retrieve such data from remote data center computers and send it along to the requesting device(s). To efficiently serve popular data, the server may use a local data store to store the data so that it does not have to be retrieved from the data center every time it is requested by a device.

SUMMARY

In some embodiments, servers (or server instances) may receive requests from client devices for data, for example streaming media such as video or audio data. The servers may be coupled to a local data store where frequently requested data may be stored (e.g., temporarily cached). When requested data is available in the local data store, a server may retrieve the data from the local data store and send it to the client device. When requested data is not in the local data store, the server may request the data from a data center, store it in the local data store, and send it to the client device. The local data store may have a limited storage capacity, and when the capacity is exhausted or data store usage reaches a threshold level (e.g., 75% of capacity), old data in the local data store may be overwritten.

Server embodiments described herein may write data to the local data store in separate directories depending on when the data is received. Each directory may include data received within a specific block of time, for example. When a threshold capacity is reached, a directory containing oldest data may be identified, and the data within the identified directory may be erased.

Particular implementations provide at least the following advantages: No table of contents may be required to perform local data store cleanup, because whichever directory contains the oldest data may be erased, as opposed to looking up which data was saved first in a table or reading through metadata for the data in the local data store to determine what to delete. This may improve server and local data store performance, as table lookups may require processing resources and time. Lookups may be used for finding the requested data only, so that future requests for the same data may be served directly from the local data store (including requests to move forward in a stream) without redownloading from a data center. Directories may be created corresponding to blocks of time and may be of non-uniform size, so that individual files or streams that are stored to a directory may fit within a single directory, aiding in file or stream location (including locating advance data in the stream to facilitate moving forward in the stream) when a stored file is requested.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
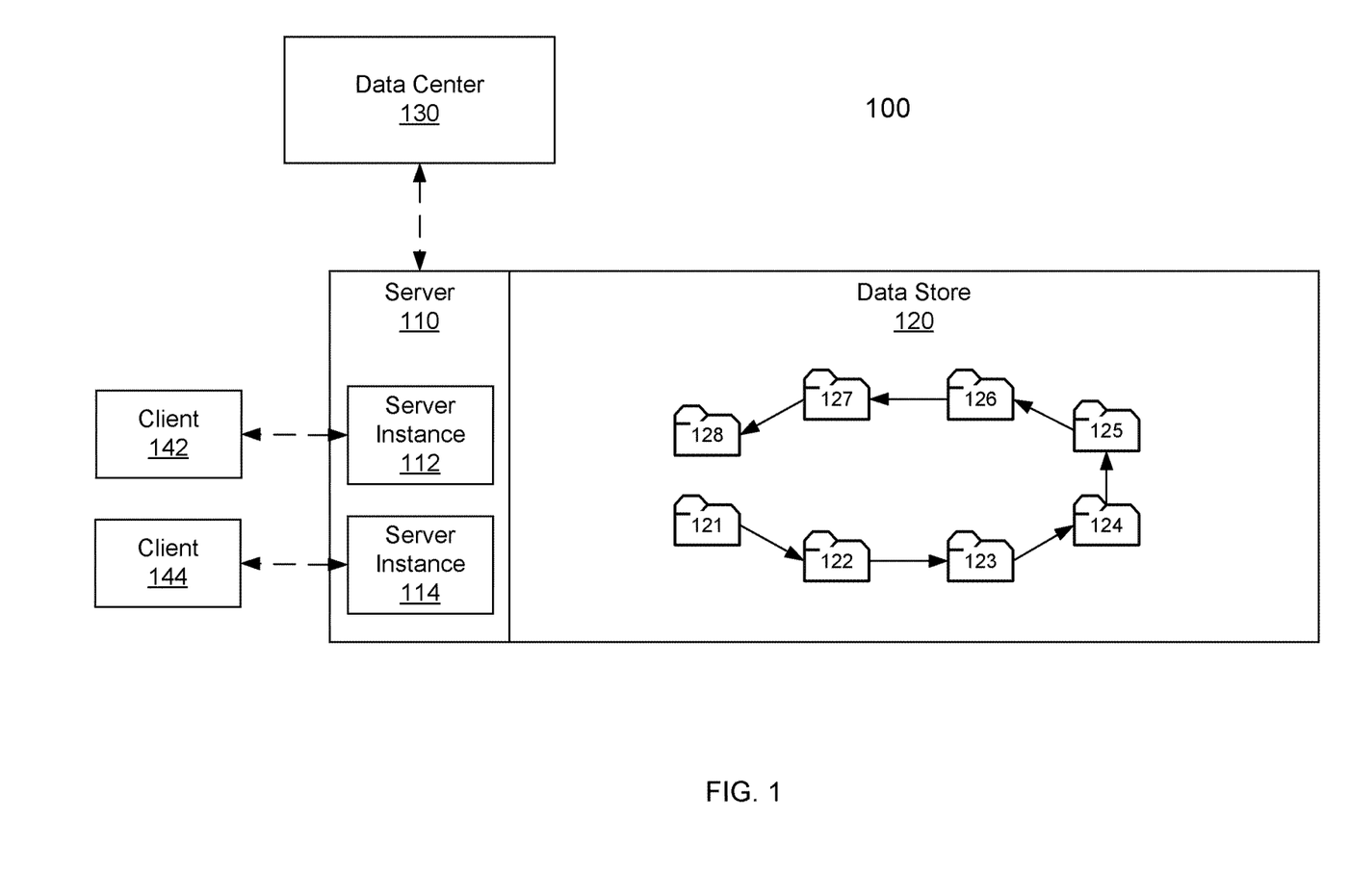
FIG. 1 is an example system including a data store with a time-based directory structure.

FIG. 1 illustrates an example system 100 for managing data using a time-based directory structure. A computing device (e.g., client 142 and 144) may be one of a variety of electronic devices including, but not limited to, laptop computers, desktop computers, computer terminals, television systems, tablet computers, e-book readers, smart phones, watches, and wearable computers.

A server 110 may serve data to clients on a network such as the internet and/or may be a private server (e.g., data center 130) serving data to other servers. For example, server 110 may be a media server that may receive requests from clients 142 and 144 for streaming media such as audio or video. A server may serve single clients individually or may instantiate one or more server instances 112 and 114 to serve multiple clients at the same time.

Data center 130 may be a repository of data, such as streaming media, accessible to a plurality of geographically diverse servers 110. Servers 110 and/or server instances 112 and 114 may request and receive data from data center 130 upon request from clients 142 and 144 in order to serve the data to clients 142 and 144, for example. In some embodiments, data center 130 and one or more of servers 110 may be elements of a content delivery network (CDN), and may even be provided by the same computer in some cases. In some embodiments, data center 130 may serve as a data repository for servers 110, and servers 110 may be part of a CDN. In addition to streaming media, data center 130 may be used to store any type of data that may be requested by clients 142 and 144 and served by servers 110.

Servers 110 may comprise and/or may be coupled to one or more local data stores 120. Servers 110 may store data that is frequently requested by clients in the local data store 120 so that such data does not have to be retrieved from the data center 130 each time it is requested.

While one server 110 comprising two server instances 112 and 114, one local data store 120, one data center 130, and two clients 142 and 144 are shown in FIG. 1, network 100 may be scalable such that any number of servers, server instances, local data stores, data centers, and/or clients may be present.

The local data store 120 may store data in a directory structure. For example, as shown in FIG. 1, a plurality of directories 121-128 may be established in the local data store 120. Eight directories 121-128 are shown in FIG. 1, but any number of directories may be present and/or created.

The directories 121-128 may be arranged such that directories 121-128 may be created and/or filled one after the other until local data store 120 is filled or reaches some threshold storage limit, at which time a directory 121 containing oldest data may be identified and cleared (e.g., deleted).

For example, server 110 may store data in a first directory 121 for a period of time (e.g., 3 minutes), and then a second directory 122 may be created. Server 100 may store data in the second directory 122 for a second, equal period of time, and then a third directory 123 may be created, and so on. When a threshold capacity is reached, first directory 121 may be deleted, and the next time a threshold capacity is reached, second directory 122 may be deleted, and so on. This process may repeat each time the local data store 120 is filled or reaches the threshold storage limit.

In some implementations, the directories may be labeled sequentially (e.g., 1, 2, 3, 4, etc.) such that the oldest directory (e.g., 1) may be easily found and deleted when the amount of data stored in local data store 120 reaches or exceeds the threshold storage limit. For example, to generate a label (e.g., name, identifier, etc.) for a new directory based on a 3 minute period of time, server instance 112 may perform integer division on the current timestamp (e.g., current time/3=directory label) and use the result as the label for the directory. Accordingly, local data store 120 cleanup (e.g., deleting old data to free disk space and/or keep free disk space at or above a predefined level) may be accomplished automatically and without using a table of contents or metadata for the stored data (e.g., timestamp metadata) to look up the oldest data. A directory 121 to which data was written to least recently may be identified, and it may be assumed that the data therein is the oldest data. For example, the cleanup process may simply find the oldest directory or the directory having the earliest (e.g. smallest) label in the sequence of directories. In some embodiments, it may be desirable to clear the oldest data first under the assumption that it is least likely to be currently popular and likely to be requested by a client, for example.

Example Directory Structure

FIGS. 2A-2E illustrate an example directory structure in the local data store 120 as it is being modified by the system 100 over time. In FIGS. 2A-2E, directories in solid line (e.g., directory 221 of FIG. 2A) are directories in which data has been stored, directories in dashed line (e.g., directory 222 of FIG. 2A) are currently selected directories into which data may be currently written, and dashed vertical line 210 designates a storage threshold after which a directory is to be cleared.

Figure 2A:
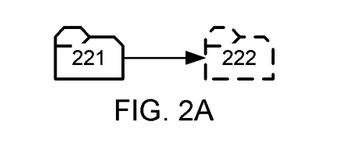
FIGS. 2A-2E are example time-based directory structures.

FIG. 2A shows an example wherein data has been stored in directory 221 and a time interval has elapsed. Directory 222 may be created, and any data received for storage in local data store 120 during the current time interval may be stored in directory 222.

Figure 2B:
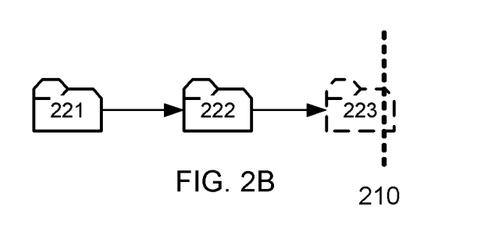

In FIG. 2B, another time interval has elapsed, and directory 223 has been created and is the currently selected directory into which data may be stored. However, the threshold 210 may have been reached or exceeded during this time interval. This may trigger a directory cleanup process (e.g., process 500 of FIG. 5, described below).

Figure 2C:
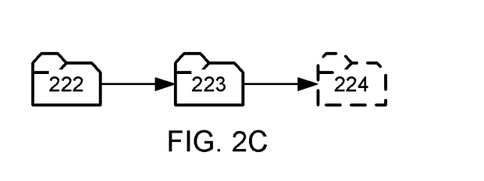

In FIG. 2C, the directory cleanup process may have been performed in response to reaching or exceeding the threshold 210 in FIG. 2B. Accordingly, directory 221 may be deleted, because it may contain the oldest data. Now, after another time interval has elapsed, directory 224 is the current directory.

Figure 2D:
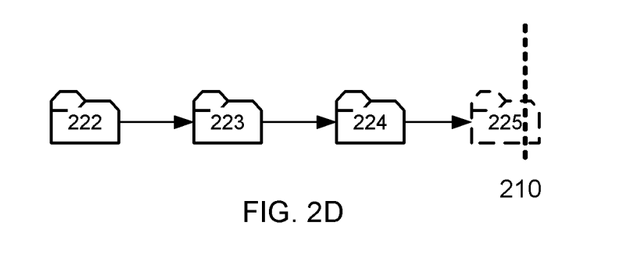

As shown in FIGS. 2C-2D, if the threshold is not reached in one time interval, no additional directories may be cleared, and instead a new directory 225 may be created as the next directory for the next time interval. Because the amount of data being stored in any given interval may vary, it may be possible that directories are not continuously being cleared, as this example shows.

In FIG. 2D, the threshold 210 may be met or exceeded again. This may trigger the directory cleanup process again.

Figure 2E:
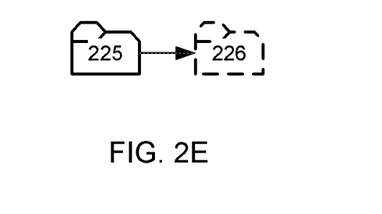

In FIG. 2E, the directory cleanup process has been performed in response to reaching or exceeding the threshold 210 in FIG. 2D. In this case, clearing one directory was not enough to get below the threshold (e.g., because oldest directory 222 and next oldest directory 223 did not have much data stored therein). Accordingly, multiple directories 222-224 have been deleted. Now, after another time interval has elapsed, directory 226 is the current directory.

FIGS. 2A-2E show one possible sequence of storage process (e.g., process 400 of FIG. 4, described below) and directory cleanup process (e.g., process 500 of FIG. 5, described below) combinations. However, any variety of combinations may be possible, yielding any variety of directory structures, depending on factors such as interval size, threshold value, local data store 120 capacity, server 110 load and/or client demand, variability of requested data, etc.

Example Data Storage and Cleanup Processes

Figure 3:
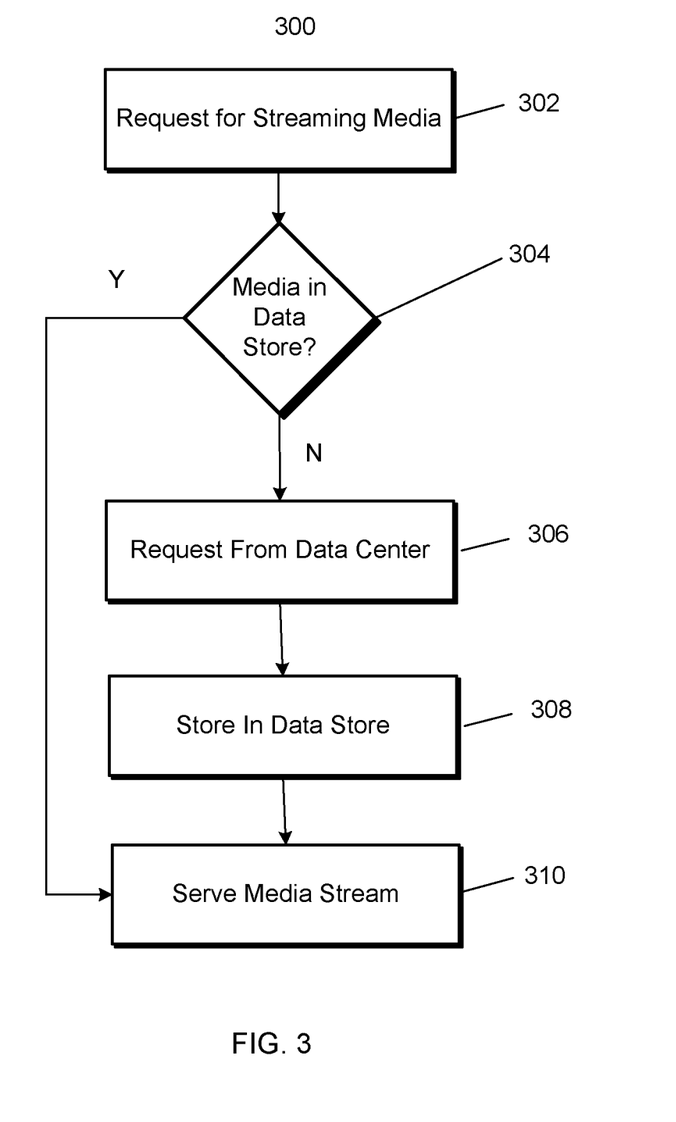
FIG. 3 is an example data service process.

FIG. 3 is an example process 300 by which server 110 or an element thereof (e.g., server instance 112) may locate data from local data store 120 and/or retrieve data from remote data center 130 for serving to a client 142. When server 110 receives a request for data from client 142, for example a request to stream video and/or audio data, server 110 may attempt to serve locally stored data first. This may reduce bandwidth use on the network linking server 110 and remote data center 130 and enable fast responses to client 142 requests.

At step 302, server 110 may receive a request for data from client 142, such as a request for a media stream. In server 110 configured to run multiple server instances, server instance 112 may be created to handle the client 142 request, or an already running server instance 112 may process the request.

At step 304, server instance 112 may determine whether the requested media item is in the local data store. For example, server instance 112 may check a table of contents of local data store 120 to determine whether the requested media stream has already been stored therein (e.g., because the media stream is frequently requested and/or has been recently requested). The table of contents may indicate a directory in which the media stream is stored. In some embodiments, each object (e.g., media stream) may be stored as a separate file, so server instance 112 may check for file existence to verify that a file is available. When the requested media item is already in local data store 120, process 300 may proceed to step 310. When the requested media item is not in local data store 120, process 300 may proceed to step 306.

At step 306, server 110 may obtain the requested media item from the remote data center 130. For example, when the requested media stream is not in data store 120, server instance 112 may contact data center 130 to request the media stream 306. Data center 130 may send and/or stream the media stream to server 110.

At step 308, server instance 112 may store the requested media item (e.g., in a currently active directory of local data store 120). As described in greater detail below, the currently active directory may be selected based on a time-based scheme wherein new directories are selected and/or created as currently active directories in succeeding regular time intervals.

At step 310, server instance 112 may stream the media stream to client 142 from local data store 120. In some embodiments, data received from data center 130 may be encrypted, and server instance 112 may decrypt the data before sending to client 142. In some embodiments, the decrypted data may be the data stored in local data store 120.

In addition to storing the media stream itself, server instance 112 may update the table of contents to indicate what is being stored and how to find it in the local data store 120 (e.g., the directory in which the media is being stored, the starting point, and/or the total file size). For example, when download of an object (e.g., a streaming media file) from data center 130 to local data store 120 is complete, server instance 112 may store the object's location on disk of the memory space of server instance 112, so the location information may persist across instance restarts and may be shareable across multiple instances. This may result in higher availability and reduced redundant storage of objects in local data store 120.

In some embodiments, server instance 112 may serve data to client 142 at the same time as server instance 112 is storing the data in local data store 120 (e.g., steps 308 and 310 may be performed simultaneously). For example, server instance 112 may start storing the media stream and start sending the stored portion of the media stream to client 142 before receiving the entire media stream from data center 130.

Figure 4:
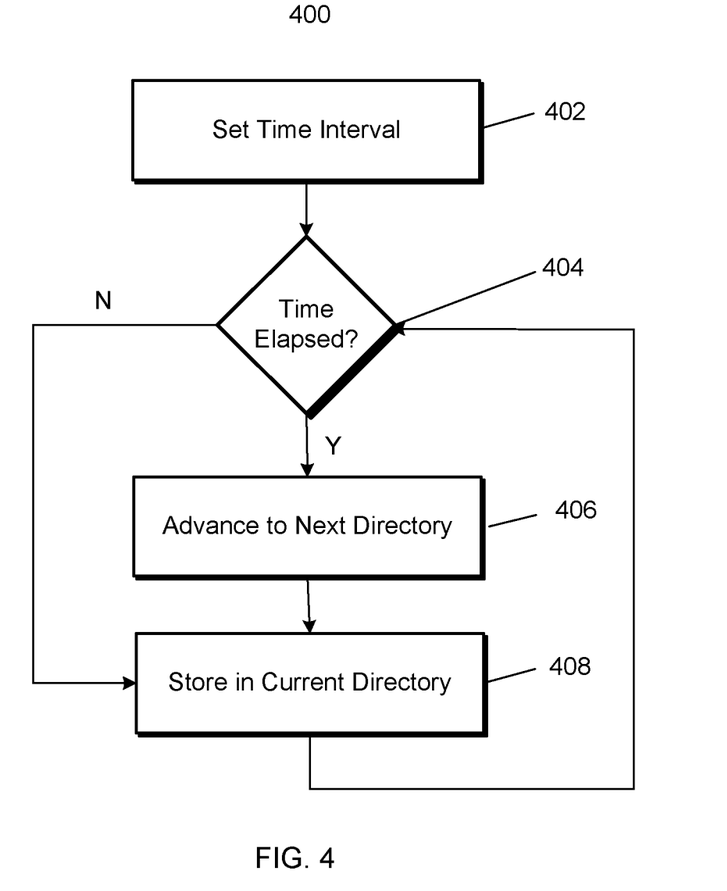
FIG. 4 is an example time-based storage process.

FIG. 4 is a flow diagram of an example time-based storage process 400 which may be performed by server 110 for storing data in local data store 120. The time-based storage process 400 may facilitate local data store 120 cleanup by periodically establishing new directories into which data may be stored. For example, as the server 110 receives streaming media data from remote data center 130, server instance 112 may store the data locally in addition to serving the data to client 142. The directory in which the data is stored at any given time may be a currently active directory which may change at regular intervals. Directories may be identified in such a way that an oldest directory can be determined without a table of contents. For example, the first directory used may have a name including the number 1, the second directory may have a name including the number 2, and so on, such that the oldest directory is named with the lowest number.

At step 402, server 110 may set a time interval 402 at which an active or current directory may be changed. The time interval may be any length of time, and three minutes is used herein as an example.

At step 408, during any given time interval, the server 100 may store data in a currently active directory. For example, during the first time interval, the server 100 may store data in directory 1. Directory 1 may be selected or created, and data being stored in local data store 120 (e.g., by server 110 and/or a specific server instance 112 or 114) may be stored in directory 1 until the time elapses.

At step 404, a current time interval may elapse, and a new time interval may begin.

At step 406, in response to the start of the new time interval at step 404, a new directory (e.g., directory 2) may be selected or created, and the server 100 may store data in the second directory until the time elapses again. In some embodiments, ongoing data storage may continue in the first directory. For example, if a single file is being stored in directory 1 by server instance 112, the whole file may be kept together in directory 1, so server instance 112 may continue placing the data in directory 1 even after the time elapses and directory 2 becomes the active directory. However, another server instance 114 may store new data in directory 2 during the second interval. In other embodiments, a change to a new active directory may cause all data storage to take place in the new active directory during the time interval in which the new directory is active.

The process of steps 404-408 may be repeated as long as data is being stored, with new directories being created as current directories for each new time interval. Because varying amounts of data may be received in each time interval, directories may not be of fixed size.

In situations wherein server instance 112 is serving data to client 142 at the same time as server instance 112 is storing the data in local data store 120, the data may often be received from data center 130 faster than it is being sent to client 142. Accordingly, the active directory may advance while data is being served to client 142 from the previously active directory. In some embodiments, files may be kept in a single directory, but in other embodiments, a change to a new active directory may cause all data storage to take place in the new active directory during the time interval in which the new directory is active. In the latter case, server instance 112 may store a pointer or other indication to the active directory so that when the streamed data advances to a point at which the active directory changed, server instance 112 may substantially seamlessly continue to stream the data to client 142 by switching to the correct directory for retrieval of the streaming data.

Figure 5:
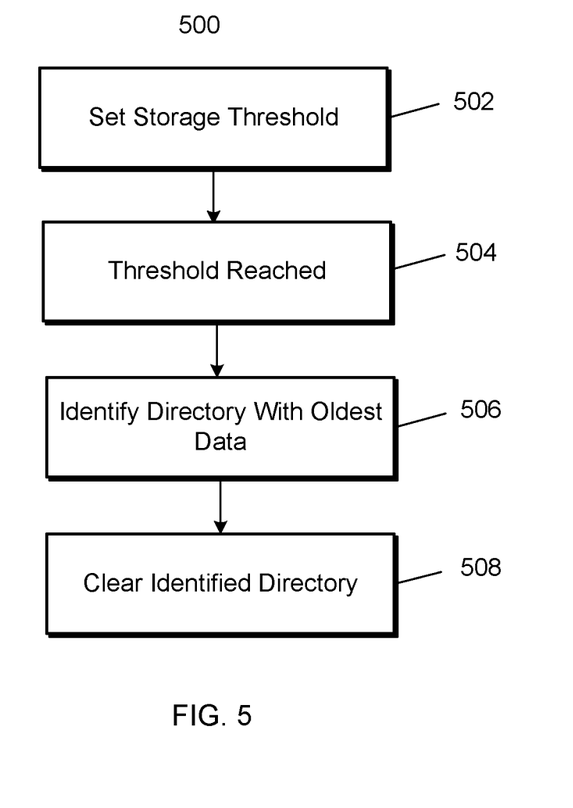
FIG. 5 is an example threshold-based directory cleanup process.

FIG. 5 is a flow diagram of an example threshold-based directory cleanup process 500 which may be performed by server 110 for enabling continuous storage of data in local data store 120, even when the local data store 120 has a fixed capacity. Server 110 may leverage the directory structure established by the time-based storage process 400 to identify and delete the oldest data stored in local data store 120 without using a table of contents, searching metadata, or any other processing-intensive method. This may allow server 110 to perform local data store 120 management efficiently and thereby improve server 110 and local data store 120 performance.

At step 502, server 110 may set a storage threshold establishing when data in local data store 120 is to be erased. For example, a threshold of 75% capacity, or some other threshold, may be established so that when the local data store 120 is 75% full or more, the rest of the directory cleanup process 500 may be performed.

At step 504, the threshold established at step 502 may be reached. For example, a number of server instances 112 and 114 may be actively serving data to clients 142 and 144 and continuously saving data received from the remote data center 130 in local data store 120 according to the time-based storage process 400 described above. At some point, local data store 120 may become sufficiently full that cleanup may be required to avoid running out of storage capacity.

At step 506, in response to the threshold being reached at step 504, the server 110 may identify a directory containing oldest data. For example, the server 110 may use the directory naming convention to identify an earliest modified directory (e.g., the directory having a name including a lowest number, as described above), In other embodiments, server 110 may use other methods for identifying the oldest directory (e.g., examining directory metadata). However, in any case, the oldest directory may be identified without looking at any description of the data within (e.g., without examining a table of data contents or searching metadata for the stored data).

At step 508, server 110 may clear the data in the identified oldest directory. For example, the entire directory may be deleted. In some cases, deleting a single directory may not bring the total used storage in local data store 120 below the threshold. When this happens, steps 506 and 508 may be repeated until the capacity is below the threshold. A new oldest directory may be identified and deleted.

The threshold-based directory cleanup process 500 may be continuously active within server 110 such that steps 506-508 may be performed every time a threshold is reached at step 504. Accordingly, local data store 120 may be managed and maintained by server 110 automatically and without periodic reading of object location information. Note that because object location information need not be read to perform directory cleanup, timestamps and/or other metadata used to select specific objects for deletion may not be stored in some embodiments.

Example System Architecture

Figure 6:
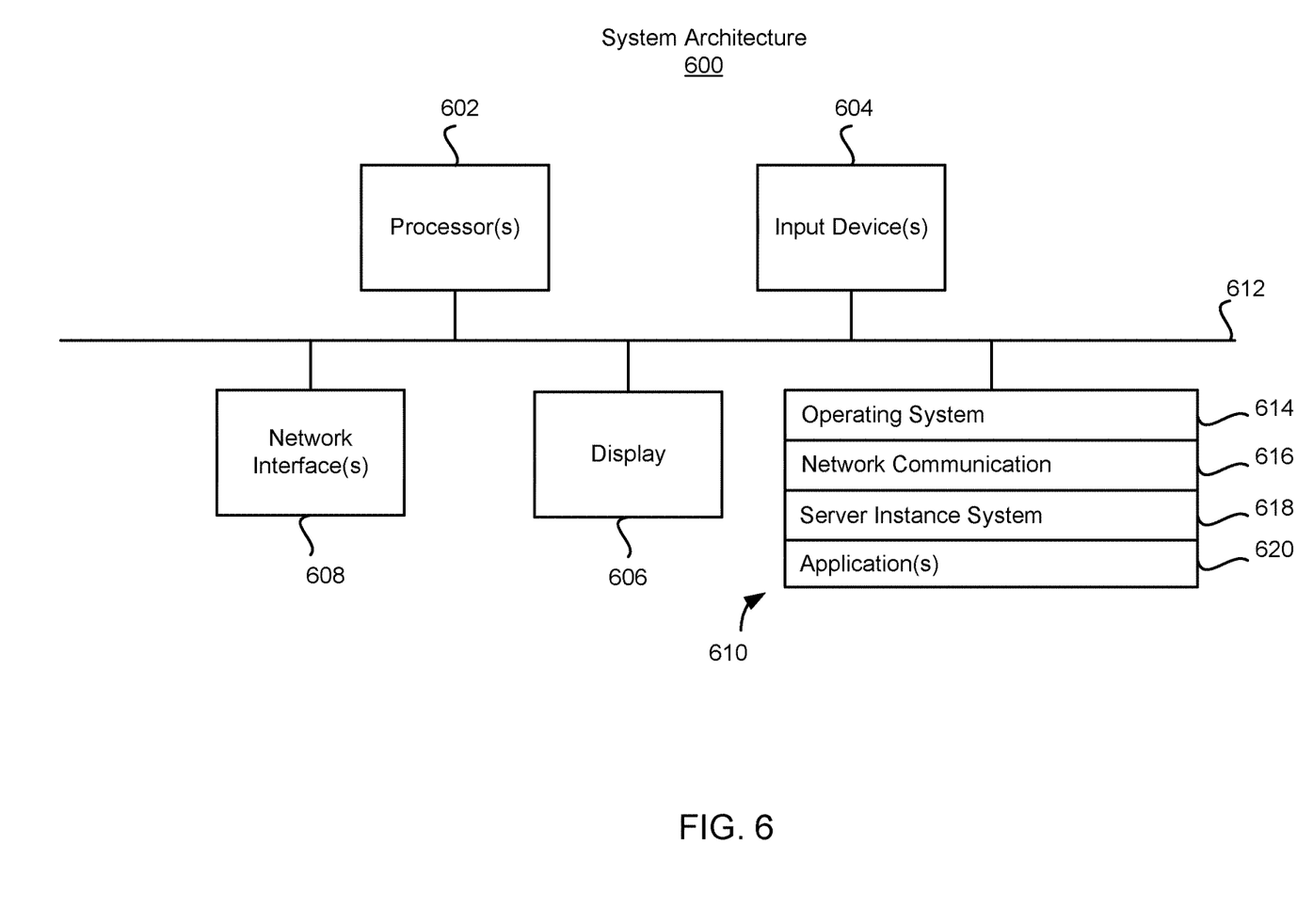
FIG. 6 is an example server configured to manage a data store with a time-based directory structure.

FIG. 6 is a block diagram of an example system architecture implementing the features and processes of FIGS. 3-5. The architecture 600 may be implemented on any electronic device that runs software applications derived from compiled instructions, including without limitation personal computers, servers, smart phones, media players, electronic tablets, game consoles, email devices, etc. In some implementations, the architecture 600 may include one or more processors 602, one or more input devices 604, one or more display devices 606, one or more network interfaces 608, and one or more computer-readable mediums 610. Each of these components may be coupled by bus 612.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, etc.).

A server instance system 618 can include instructions that may generate and provide server instances that use or implement the processes described in reference to FIGS. 1-5. For example, the server instance system 618 may create and support server instances 112 and 114 described above.

Application(s) 620 may be an application that uses or implements the processes described in reference to FIGS. 1-5. The processes may also be implemented in operating system 614.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
receiving, at a server, from a data center, data during a plurality of sequential blocks of time;
storing, by the server, the data, by:
storing a first portion of the data received during a first block of time of the plurality of sequential blocks of time in a first directory associated with the first block of time within the data store;
storing a first subset of a second portion of the data in a second directory associated with a second block of time of the plurality of sequential blocks of time within the data store, wherein the second portion of the data is received during a second block of time of the plurality of sequential blocks of time; and
storing a second subset of the second portion of the data in the first directory within the data store;
determining, by the server, that a threshold storage capacity of the data store has been reached; and
in response to determining that the threshold storage capacity of the data store has been reached:
identifying, by the server, a directory storing a portion of the data that corresponds to an oldest block of time based upon characteristics of the directory; and
clearing, by the server, the identified directory.

2. The method of claim 1, further comprising storing, by the server, information identifying portions of the data stored in each directory.

3. The method of claim 2, further comprising:
receiving, at the server, a request for a subset of the data from a client device;
searching, by the server, the information to determine whether the requested data is stored within the data store;
in response to determining that the requested data is stored within the data store, sending, by the server, the requested data to the client; and
in response to determining that the requested data is not stored within the data store, sending, by the server, a request for the data to a data center.

4. The method of claim 1, wherein the data being cached comprises streaming media data, the method further comprising streaming, by the server, the data to a client device.

5. The method of claim 1, further comprising storing, by the server, a portion of the data received in a next block of time in a new directory.

6. The method of claim 1, further comprising, prior to the threshold storage capacity of the data store being reached, creating, by the server, a new directory for each block of the plurality of sequential blocks of time.

7. The method of claim 1, wherein the first and second directories are of non-uniform size.

8. The method of claim 1, wherein the characteristics of the directory are derived from metadata associated with the directory, naming convention of the directory, or a combination thereof.

9. The method of claim 1, wherein each block of the plurality of sequential blocks of time is of a duration of 3 minutes.

10. The method of claim 1, wherein clearing the identified directory comprises deleting the portion of the data corresponding to the oldest block of time, deleting the identified directory, or any combination thereof.

11. An apparatus comprising:
a data store; and
a processor configured to:
receive data from a data center during a plurality of sequential blocks of time;
store the data within the data store, by:
storing a first portion of the data received during a first block of time of the plurality of sequential blocks of time in a first directory set as a first active directory during the first block of time;
when the first block of time expires, setting a second directory as a second active directory into which data received during a second block of time of the plurality of sequential blocks of time is to be stored; and storing a second portion of the data received during the second block of time in the first directory;

determine that a threshold storage capacity of the data store has been reached; and in response to determining that the threshold storage capacity of the data store has been reached:

identify a directory storing a portion of the data that corresponds to an oldest block of time based upon characteristics of the directory; and clear the identified directory.

12. The apparatus of claim 11, wherein the processor is further configured to store information identifying portions of the data stored in each directory in the data store.

13. The apparatus of claim 12, wherein the processor is further configured to:

receive a request for a subset of the data from a client device;

search the information to determine whether the requested data is stored within the data store;

in response to determining that the requested data is stored within the data store, send the requested data to the client; and in response to determining that the requested data is not stored within the data store, send a request for the data to a data center.

14. The apparatus of claim 11, wherein:

the data being cached comprises streaming media data; and the processor is further configured to stream the data to a client device.

15. The apparatus of claim 14, wherein the processor is further configured to instantiate a plurality of server instances configured to stream the data to one or more client devices.

16. The apparatus of claim 11, wherein the processor is further configured to, prior to the threshold storage capacity of the data store being reached, create a new directory for each block of the plurality of sequential blocks of time.

17. The apparatus of claim 11, wherein the processor is further configured to instantiate a plurality of server instances configured to receive the data and store the data.

18. The apparatus of claim 11, wherein the first and second directories are of non-uniform size.

19. The apparatus of claim 11, wherein each block of the plurality of sequential blocks of time is of uniform size.

20. A non-transitory computer readable medium comprising:

computer program code for instantiating at least one server instance;

computer program code for storing, with the at least one server instance from a data center, data received during a plurality of sequential blocks of time in a data store associated with the server, the storing comprising:

storing a first portion of the data received during a first block of time of the plurality of sequential blocks of time in a first directory associated with the first block of time within the data store;

storing a first subset of a second portion of the data in a second directory associated with a second block of time of the plurality of sequential blocks of time within the data store, wherein the second portion of the data is received during a second block of time of the plurality of sequential blocks of time; and storing a second subset of the second portion of the data in the first directory within the data store;

computer program code for determining that a threshold storage capacity of the data store has been reached; and computer program code:

for, in response to determining that the threshold storage capacity of the data store has been reached, identifying a directory storing a portion of the data that corresponds to an oldest block of time based upon characteristics of the directory; and for clearing the identified directory.

21. The non-transitory computer readable medium of claim 20, further comprising computer program code for storing, with the at least one server instance, information identifying portions of the data stored in each directory.

22. The non-transitory computer readable medium of claim 21, further comprising:

computer program code for searching, with the at least one server instance in response to receiving a request for a subset of the data from a client device, the information to determine whether the requested data is stored within the data store;

computer program code for sending, with the at least one server instance in response to determining that the requested data is stored within the data store, the requested data to the client; and computer program code for sending, with the at least one server instance in response to determining that the requested data is not stored within the data store, a request for the data to a data center.

23. The non-transitory computer readable medium of claim 20, wherein the data being stored comprises streaming media data, the non-transitory computer readable medium further comprising computer program code for streaming, with the at least one server instance, the data to a client device.

24. The non-transitory computer readable medium of claim 20, further comprising computer program code for storing, with the at least one server instance, a portion of the data received in a next block of time in a new directory.

25. The non-transitory computer readable medium of claim 20, further comprising computer program code for, prior to the threshold storage capacity of the data store being reached, creating a new directory for each block of the plurality of sequential blocks of time.

26. The non-transitory computer readable medium of claim 20, wherein the first and second directories are of non-uniform size.

27. The non-transitory computer readable medium of claim 20, wherein each block of the plurality of sequential blocks of time are of uniform size.

28. The non-transitory computer readable medium of claim 20, wherein the at least one server instance comprises a plurality of server instances configured to access the data store.

29. A method comprising:

receiving, at a server associated with a data center, from a data center, data during a period of time, wherein the period of time comprises a first block of time and a second block of time, wherein the first block of time and the second block of time are sequential blocks of time, wherein a first data portion is received during the first block of time and a second data portion is received during the second block of time, wherein the first data portion is received before the second data portion;

storing, by the server:

the first data portion in a first directory corresponding to the first block of time in a data store;

a first subset of the second data portion in the first directory; and a second subset of the second data portion in a second directory corresponding to the second block of time in the data store;

determining, by the server, that a threshold storage capacity of the data store has been reached; and in response to determining that the threshold storage capacity of the data store has been reached:

identifying, by the server, the first directory storing the first data portion received during the first block of time; and clearing, by the server, the first directory.

30. The method of claim 29, further comprising:

receiving, at the server, a request for a subset of the data from a client device;

searching, by the server, the information to determine whether the requested data is stored within the data store;

in response to determining that the requested data is stored within the data store, sending, by the server, the requested data to the client; and in response to determining that the requested data is not stored within the data store, sending, by the server, a request for the data to the data center.

31. The method of claim 29, wherein the data being cached comprises streaming media data, the method further comprising streaming, by the server, the data to a client device.

32. The method of claim 29, further comprising, prior to the threshold storage capacity of the data store being reached, creating, by the server, a new directory for each block of the plurality of sequential blocks of time.

33. The method of claim 29, wherein the first and second directories are of non-uniform size.

34. The method of claim 29, wherein each block of the plurality of sequential blocks of time is of uniform size.

* * * * *